(12) United States Patent
Anami et al.

(10) Patent No.: US 11,188,424 B2
(45) Date of Patent: Nov. 30, 2021

(54) APPLICATION-AWARE VIRTUAL MACHINE BACKUP

(71) Applicant: ENTIT SOFTWARE LLC, Sanford, NC (US)

(72) Inventors: Veeresh Mallappa Anami, Karnataka (IN); Sunil Turakani, Karnataka (IN)

(73) Assignee: Micro Focus LLC, Santa Clara, CA (US)

( * ) Notice: Subject to any disclaimer, the term of this patent is extended or adjusted under 35 U.S.C. 154(b) by 189 days.

(21) Appl. No.: 16/183,544

(22) Filed: Nov. 7, 2018

(65) Prior Publication Data

US 2019/0163578 A1    May 30, 2019

(30) Foreign Application Priority Data

Nov. 28, 2017    (IN) .............................. 201741042717

(51) Int. Cl.
*G06F 11/14*    (2006.01)
*G06F 9/455*    (2018.01)

(52) U.S. Cl.
CPC ...... *G06F 11/1464* (2013.01); *G06F 9/45558* (2013.01); *G06F 11/1453* (2013.01); *G06F 2009/45562* (2013.01); *G06F 2009/45575* (2013.01); *G06F 2009/45583* (2013.01); *G06F 2009/45595* (2013.01); *G06F 2201/815* (2013.01)

(58) Field of Classification Search
CPC ............. G06F 11/1464; G06F 9/45558; G06F 11/1453; G06F 2009/45575; G06F 2009/45562; G06F 2201/815; G06F 2009/45583; G06F 2009/45595; G06F 11/1469; G06F 11/1451
See application file for complete search history.

(56) References Cited

U.S. PATENT DOCUMENTS

| | | | |
|---|---|---|---|
| 9,495,404 B2 | 11/2016 | Kumarasamy et al. | |
| 9,658,925 B1 | 5/2017 | Damodharan et al. | |
| 9,703,956 B1 | 7/2017 | Watson et al. | |
| 9,740,577 B1* | 8/2017 | Chakraborty | G06F 11/1469 |
| 2009/0313447 A1* | 12/2009 | Nguyen | G06F 9/45558 |
| | | | 711/162 |
| 2010/0262794 A1* | 10/2010 | De Beer | G06F 9/45533 |
| | | | 711/162 |

(Continued)

FOREIGN PATENT DOCUMENTS

WO    WO-2017099827    6/2017

OTHER PUBLICATIONS

Ayoubi et al. "Towards Promoting Backup-Sharing in Survivable Virtual Network Design", IEEE/ACM Transactions on Networking (TON), vol. 24, Issue 5, p. 3218-3231 (Year: 2016).*

(Continued)

*Primary Examiner* — Mark D Featherstone
*Assistant Examiner* — Kweku William Halm

(57) ABSTRACT

A method relates to backing up a VM. The method can include placing an application being hosted by a VM in a backup state and capturing a snapshot of the VM to generate a VM image of the VM. The method can further comprise resuming the application, extracting application blocks corresponding to the application from the mounted VM image, and storing the application blocks and the VM image.

20 Claims, 7 Drawing Sheets

(56) References Cited

U.S. PATENT DOCUMENTS

| | | | | |
|---|---|---|---|---|
| 2014/0095816 A1* | 4/2014 | Hsu | ...................... | G06F 11/1469 |
| | | | | 711/162 |
| 2014/0096134 A1* | 4/2014 | Barak | ................... | G06F 21/566 |
| | | | | 718/1 |
| 2015/0095597 A1* | 4/2015 | Ayanam | .................. | G06F 3/065 |
| | | | | 711/162 |
| 2015/0324144 A1* | 11/2015 | Vasilyev | ............... | G06F 3/0664 |
| | | | | 711/162 |
| 2015/0339143 A1 | 11/2015 | Shih et al. | | |
| 2016/0154709 A1* | 6/2016 | Mitkar | ................ | G06F 11/1466 |
| | | | | 707/649 |
| 2017/0091047 A1 | 3/2017 | Prashanth et al. | | |
| 2017/0220368 A1* | 8/2017 | Tse | ...................... | G06F 9/45558 |

OTHER PUBLICATIONS

Meister et al., "Multi-level comparison of data deduplication in a backup scenario", SYSTOR '09: Proceedings of SYSTOR 2009: The Israeli Experimental Systems ConferenceMay 2009, Article No. 8, pp. 1-12 (Year: 2009).*

Andy Barhorst, VSQUEAK Tech Blogging . . . and more! Application Aware—Why You Should Care, Apr. 3, 2014 (6 pages).
Commvault Systems, Performing an Application Aware Backup downloaded Aug. 21, 2017 (4 pages).
Hewlett Packard Enterprise, HPE Data Protector, Software Version 9.09, Integration Guide, Mar. 2017 (808 pages).
Oracle—Oracle8i Parallel Server Administration, Deployment and Performance, Release 2 (8.1.6), Part No. A769 70-01, Backing up Your Database, 2000 (19 pages).
Oracle, 7 RMAN Backup Concepts dated on or before Oct. 11, 2017 (22 pages).
Oracle, Database Backup and Recovery User's Guide dated on or before Sep. 28, 2017 (31 pages).
Vembu, Application Aware Backups and Granular Recovery downloaded Aug. 23, 2017 (3 pages).
VMware, Technical Note, Designing Backup Solutions for VMware vSphere, VMware vStorage APIs for Data Protection, 2009 (25 pages).
VMWare, Virtual Disk API Programming Guide, Virtual Disk Development Kit 1.2, 2010 (66 pages).
Wikipedia, Data deduplication last edited Sep. 5, 2017 (4 pages).

* cited by examiner

APPLICATION-AWARE VIRTUAL MACHINE BACKUP

CROSS REFERENCE TO RELATED APPLICATION

This application claims the benefit of Indian Appl No. 201741042717 filed 28 Nov. 2017, which is hereby incorporated by reference.

BACKGROUND

Systems and devices can be backed up to protect against data loss. Data can be backed up to recover lost data. Data can be lost for a number of reasons such as data deletion and/or corruption. A system can be protected by backing up the data stored on the system and/or by backing up an image of the system.

DETAILED DESCRIPTION

Figure 1:
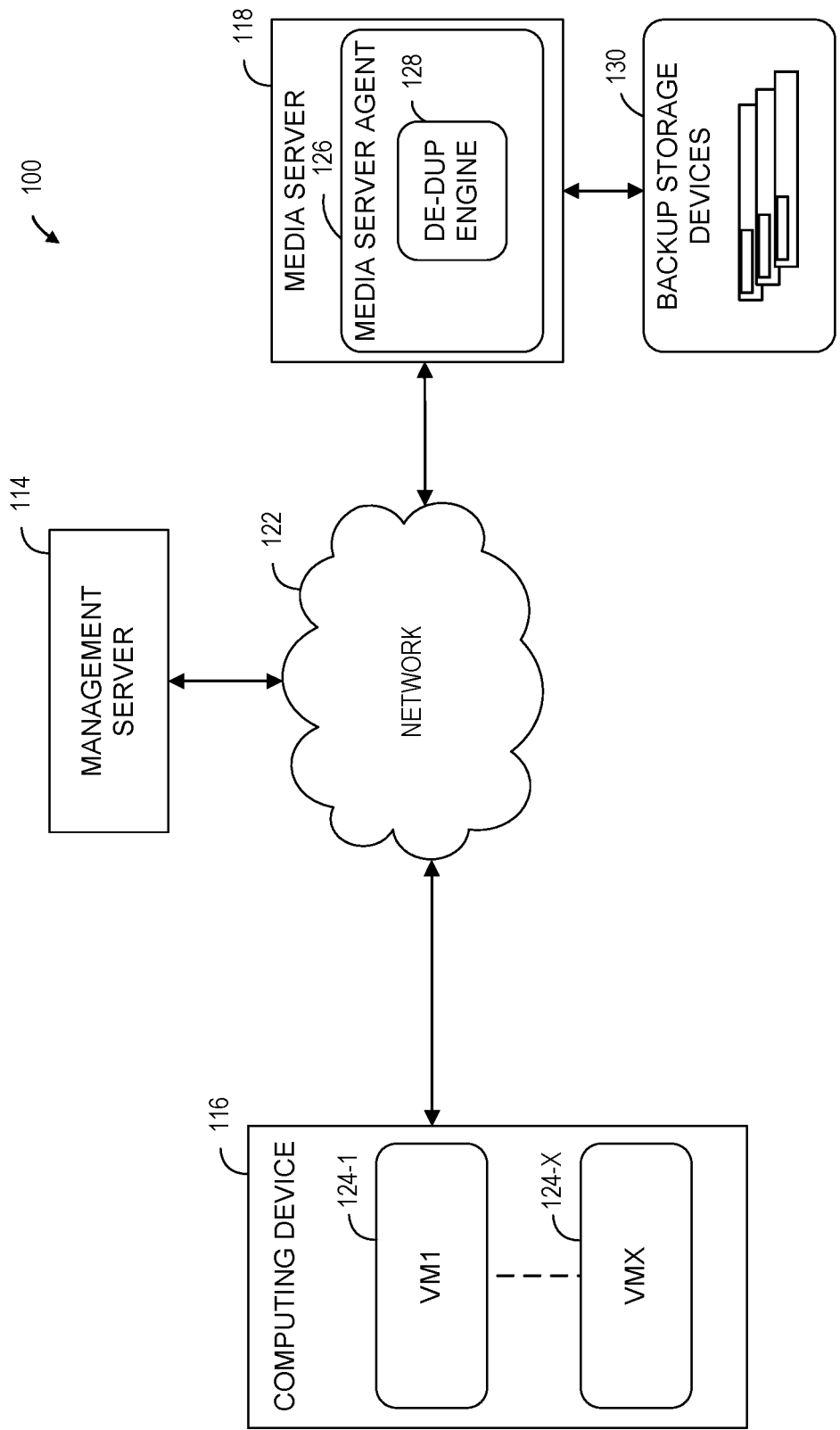
FIG. 1 illustrates a system for backing up a virtual machine consistent with the disclosure.

Data centers utilize virtualization technology to realize benefits including reduced operation and maintenance costs, ease of deploying multiple virtual machines, and improved utilization of resources. Organizations may deploy database applications such as Oracle, DB2, MS Exchange, MS SQL, MySQL, and/or PostgreSQL, among other database applications utilizing virtual machines (VMs). Each of the VMs can simulate a physical device/system and provide ease of management and maintenance in the virtual infrastructure. As with the physical infrastructure, the virtual infrastructure including applications and/or file systems can be protected.

A protection strategy can include backing up a VM and/or an application using a VM image-level backup and/or an application-level backup, respectively. In some examples, an application can include a database application or a different type of application. Backing up a VM and/or an application can include backing up data associated with the VM and/or data associated with the application.

In some approaches, backing up a VM and an application separately can lead to backing up the application data twice. Data associated with the VM can include data associated with the application. As such, backing up the VM and the application can include backing up data associated with the application twice.

Some approaches do not provide flexibility of application-level restores, do not support granular application-level recovery, do not support application-aware backups, and cost more for saved bytes. Some approaches do not provide flexibility of application-level restores because VM image-level backups do not provide the ability to restore the application data without restoring the VM. An entire VM image may be restored to be able to restore or recover an application hosted by the VM.

Some approaches do not support granular application-level recovery because some approaches employing a VM image-level backup do not support point-in-time restores, latest state restores, and/or different application on different system restores, for application restores. Some approaches do not provide application aware backups. With application-level backups, the applications may be aware of the backup history. Each of the applications record the backup information and use the backup information during a restoration of the application. With VM image-level backups, the application is unaware of the backup and does not record backup information needed for recovery.

Some approaches may also cost more than a number of examples described herein. Performing application aware backups and VM image-level backups can lead to saving same or similar data sets twice utilizing twice the data. Accordingly, a storage cost of the duplicated data can cost twice as much as a storage cost of a number of examples described herein. The storage cost also includes a cost of storing duplicated data in a target device.

A number of examples describe an application aware VM backup combining the advantages of the VM image-level backup and an application-level backup while providing storage efficient, point-in-time, and agentless application aware backups.

The figures herein follow a numbering convention in which the first digit corresponds to the drawing figure number and the remaining digits identify an element or component in the drawing. For example, reference numeral 118 may refer to element "18" in FIG. 1 and an analogous element may be identified by reference numeral 218 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1 illustrates a system 100 for backing up a virtual machine consistent with the disclosure. The system 100 includes a computing device 116, a network 122, a management server 114, a media server 118, and backup storage devices 130.

The computing device 116 can include hardware and software to support a plurality of VMs (e.g., VMs 124-1, . . . , and 124-X). For example, the computing device 116 can include a processor, memory, and/or a network interface, among other components, to host the VMs 124-1 to 124-X, referred to generally as VMs 124. The computing device 116, the processor, the memory, the network interface, the VMs 124, and/or other components comprising the computing device 116 can be referenced independently or collectively as an apparatus. The processor and the memory can host a hypervisor that can host the VMs 124. In some examples, the computing device 116 can host a bare-metal hypervisor. The computing device 116 can be partitioned into the VMs 124 using the bare-metal hypervisor. In some examples, the computing device 116 can host VMware ESXi.

The management server 114 can comprise hardware and software to host a management application. The management application can manage and monitor the computing device 116, the VMs 124, and/or other components of the computing device 116. The management server 114 can manage a backup of the VMs 124 and/or applications hosted by the VMs 124. The management server 114 can also manage a restoration of the VMs 124 and/or applications. For example, the management server 114 can initiate a backup of the VMs 124 and/or the applications. The management server 114 can also initiate a restoration of the VMs 124 and/or the applications.

The VMs 124 are virtual servers hosted by the computing device 116. The VMs 124 can include operation systems (OSs), applications, and other software components that can be used to backup the VMs. In some examples, the VMs 124 can be managed by the management server 114.

The network 122 can couple the computing device 116 to the media server 118, and/or the management server 114. The network 122 can be a physical network or a virtual network. The network 122 can be a private network or a public network. The network 122 can comprise a plurality of computing devices not show.

The media server 118 can include a media server agent 126. The media server agent 126 can include a de-duplication (e.g., de-dup) engine 128. The de-duplication engine 128 can perform a de-duplication operation on VM images corresponding to the VMs 124. A de-deduplication operation can remove duplicate data blocks corresponding to one or move VMs 124 and/or applications hosted by the VMs 124 during the backup or copy operation.

The media server 118 can be coupled to the backup storage devices 130. The backup storage devices 130 can include a plurality of storage devices that can be used to store backup data associated with the VMs 124 and/or applications hosted by the VMs 124.

Figure 2:
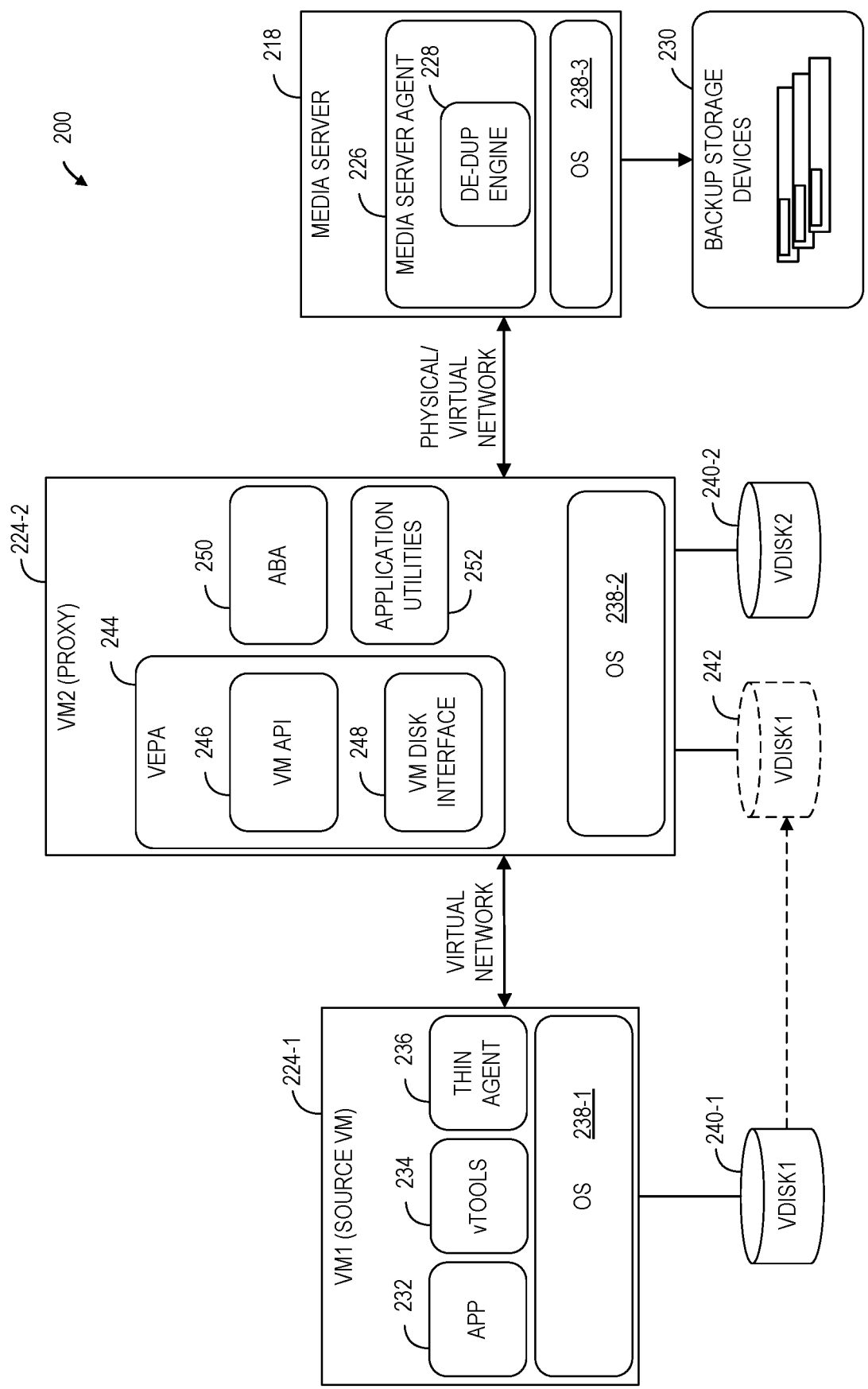
FIG. 2 illustrates a system for backing up an application and a virtual machine consistent with the disclosure.

FIG. 2 illustrates a system for backing up an application and a virtual machine consistent with the disclosure. The system 200 includes a VM 224-1, a VM 224-2, a media server 218, and backup storage devices 230. The VM 224-1 and the VM 224-2 are analogous to the VMs 124 in FIG. 1. The media server 218 and the backup storage devices 230 are analogous to the media server 118 and the storage devices 130 in FIG. 1.

The VM 224-1 comprises an application 232, virtual tools 234 (e.g., VM drivers), a thin agent 236, and an operating system (OS) 238-1. The VM 224-2 comprises a virtual environment protection agent (VEPA) 244, an application backup agent (ABA) 250, application utilities 252, and an OS 238-2. The VEPA 244 includes a VM application programing interface (API) 246 and a VM disk interface 248. The media server 218 includes the media server agent 226, the de-duplication engine 228, and the OS 238-3. The backup storage devices 230 can comprise one or more storage devices that can be used to store data. The backup storage devices 230 can comprise hardware and software. The hardware can include, for example, non-volatile memory among other types of memory.

The VMs 224-1 and 224-2 can be virtual servers hosted on a bare-metal hypervisor or any other type of hypervisor. Each of the VMs 224 is represented as set of files on a hypervisor. For example, the VMs 224 can be represented as configuration files (e.g., *.vmx, *.vmsn) and/or disk files (*.vmdk) containing OSs and applications. In the example shown in FIG. 2, a VM disk corresponding to the VM 224-1 is represented as a disk file 240-1. A VM disk corresponding to the VM 224-2 is represented as a disk file 240-2.

As previously described, the application 232 can be a database application or a different type of application. The application 232 can be an Oracle database, a DB2 database, an MS Exchange database, an MS SQL database, an MySQL database, and/or a PostgreSQL database, among other types of databases. The application 232 can be an application other than a database. The application 232 can represent a plurality of applications hosted by the VM 224-1.

The virtualization tools 234 include drivers and utilities that enhance the performance of the VM 224-1. The virtualization tools 234 can be used to deploy the thin agent 236 to the VM 224-1. The virtualization tools 234 can also remove (e.g., delete) the thin agent 236 from the VM 224-1.

The thin agent 236 can be a non-persistent agent. The thin agent 236 can also be a stand-alone agent. For example, the thin agent 236 can be pushed, stored, and/or copied to the VM 224-1. The thin agent 236 can be removed and/or deleted from the VM 224-1. In some examples, the thin agent 236 can be installed and uninstalled from the VM 224-1. The thin agent 236 can also be referred to as an application backup management agent (ABMA).

The thin agent 236 can discover a number of applications hosted by the VM 224-1. For example, the thin agent 236 can discover the application 232. The thin agent 236 can discover more application than the application 232. For example, the thin agent 236 can discover two or more applications hosted by the VM 224-1.

The thin agent 236 can analyze an environment of the application 232 and provide details of the application 232 based on the environment. For example, the thin agent 236 can list possible application objects such as databases or application files, among other types of application objects associated with the application 232.

The thin agent 236 can also perform specific pre-operation and post-operation backup tasks such as placing the application 232 in a backup state and/or bringing the application 232 out of the backup state. As part of a pre-operation backup task, the thin agent 236 can also prepare the application 232 for backup. For example, the thin agent 236 can place the application 232 in a backup state (e.g., freeze state). Placing the thin agent 236 in a backup state can be considered a pre-backup phase. The pre-backup phase places the database in a consistent state which can also be referred to as an application-consistent state. An application-consistent state can include the backup state. A consistent state of the application 232 can transfer application data from memory to disk. A consistent state of the application 232 can transfer application data from volatile memory to non-volatile memory of a system and/or device hosting the VM 224-1.

The thin agent 236 can also restore (e.g., thaw) the application 232 from the backup state. For example, the thin agent 236 can bring the application 232 out of the backup state. Restoring the application 232 from the backup state can include placing the application 232 in a normal operation state. Bringing the application 232 out of the backup state can include placing the application 232 in a state in which the application 232 was in prior to being placed in the backup state.

The VM 224-2 can also be referred to as a proxy. The VM 224-2 can be a virtual server comprising software modules. The VM 224-2 can comprise the VEPA 244. The VEPA 244 is a controlling agent to perform an application-aware backup and a VM image-level backup. The VEPA 244 can communicate with the virtualization tools 234 to store the thin agent 236 in the VM 224-1. The VEPA 244 can also instruct the thin agent 236 to place the application 232 in a backup state and/or restore the application 232 from the backup state. The VEPA 244 can further communicate with the virtual infrastructure of the VM 224-1 and/or the VM 224-2 to perform VM management tasks. The virtual infrastructure can include hypervisors, management software, and VMs, among other components of the virtual infrastructure. The VM management tasks can include creating snapshots, deleting snapshots, obtaining VM information, hot-adding VM disks onto the VM 224-2, among other management tasks. The VEPA 244 can also communicate with the ABA 250 to perform an application-aware backup. For example, the VEPA 224 can also communicate with the media server agent 226, via the ABA 250, to write data to the backup storage devices 230.

The VM API 246 comprises web service management APIs. The VM API 246 can be used by the VEPA 244 to perform a VM level snapshot of the VM 224-1. The VM disk interface 248 comprises APIs for accessing VM disks such at the disk file 240-1.

The ABA 250 is an application source agent that performs backup of the application 232 and/or the application 232 data. The application utilities 252 can be application specific utilities that aid the ABA 250 in accessing application data including application blocks corresponding to the application 232. The application utilities 252 be used to store the application backed up metadata for further use in restoring the application 232, thus making the backup and application-aware backup. In some examples, the application utilities 252 can include utilities that service a plurality of applications instead of a single application.

The media server 218 can be a physical or virtual system coupled to the backup storage devices 230 for backing up data. The media server 218 can comprise the media server agent 226 and the de-duplication engine 228.

The media agent 226 can manage data stored on the backup storage devices 230. For example, the media server agent 226 can manage read and write operations performed on the backup storage devices 230. The media server agent 226 can also optimize data stored on the backup storage devices 230 using the de-duplication engine 228. The de-duplication engine 228 comprises software to remove duplicate data blocks from a VM image 242 and application data blocks. The de-duplication engine 228 can reside on the media server 218 or part of a storage device (e.g., backup storage devices 230).

The VM 224-1 can be coupled to the VM 224-2 via a virtual network. In examples were the VMs 224 do not reside on a same computing device, the VM 224-1 can be coupled to the VM 224-2 through a physical network. The VM 224-2 can be coupled to the media server 218 via a physical or virtual network.

In some examples, the VM 224-2 can obtain the VM image 242. The VM image 242 can also be referenced as an image. The VM image 242 can correspond to a disk file 240-1 of the VM 224-1 or a plurality of disk files of the VM 224-1. For example, a snapshot of the disk file 240-1 can generate the VM image 242. The VM image 242 can be stored in the VM 224-1. The VM image 242 can transferred to the VM 224-2 using the virtual network. In some examples, the VM image 24 can be accessed by the VM 224-2 without transferring the VM image 242 through the virtual network. The VM image 242 can be mounted to the VM 224-2 utilizing the VM disk interface 248.

Figure 3:
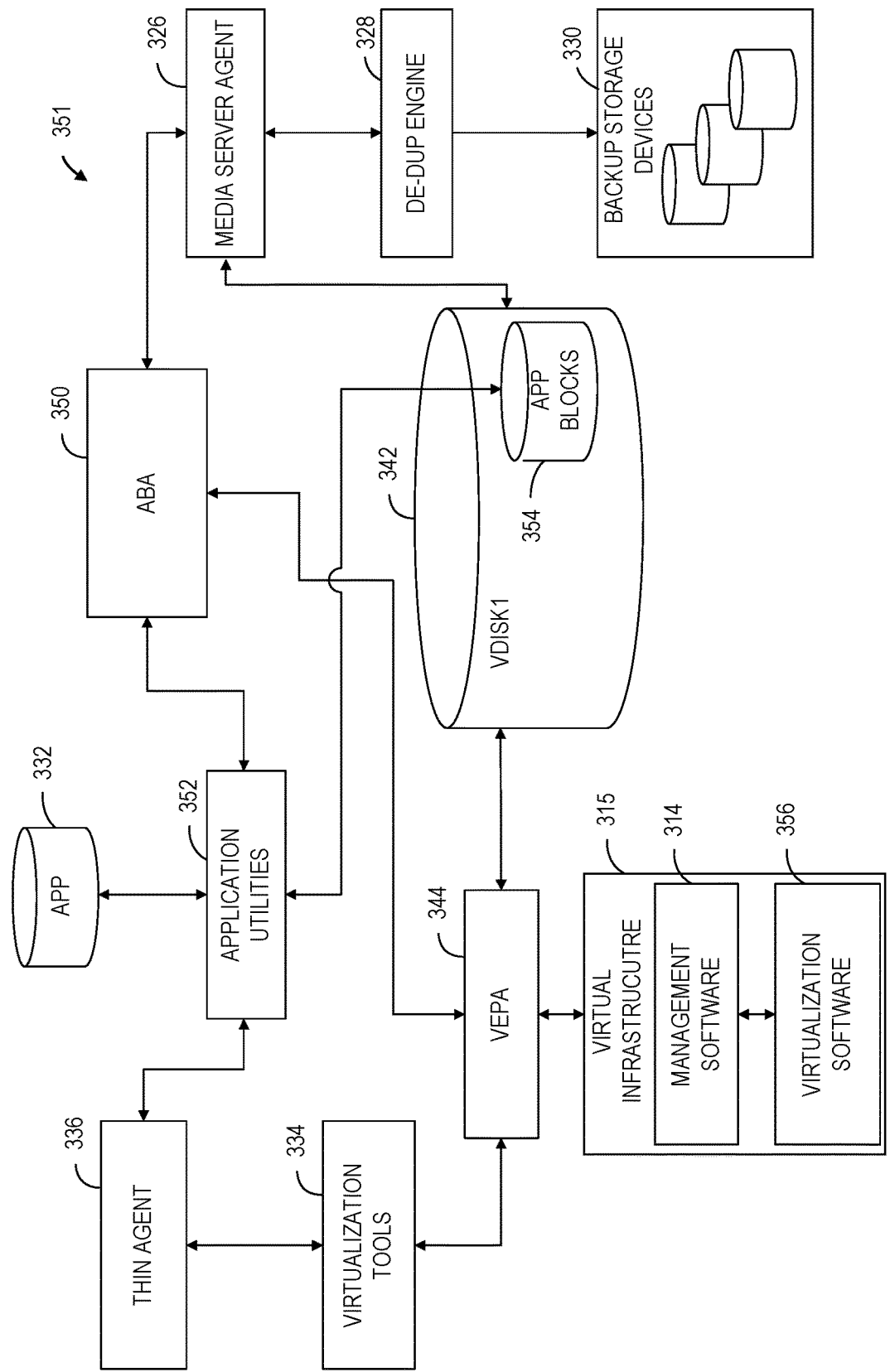
FIG. 3 illustrates a workflow for backing up an application and a virtual machine consistent with the disclosure.

FIG. 3 illustrates a workflow for backing up an application and a virtual machine consistent with the disclosure. The workflow 351 describes a backup of an application 332 and the backup of a VM (e.g., the VM 224-1). As used herein, a backup of a VM can be referred to as a VM image-level backup.

The workflow 351 includes virtual infrastructure 315. The workflow 351 includes a media server agent 326, a de-duplication engine 328, and backup storage devices 330, virtualization tools 334 which are analogous to the media server agent 226, the de-duplication engine 228, the backup storage devices 230, and the virtualization tools 234 in FIG. 2, respectively. The workflow 351 also includes a thin agent 336, a VM image 342, a VEPA 344, an ABA 350, and application utilities 352, which are analogous to the thin agent 236, the VM image 242, the VEPA 244, the ABA 250, and the application utilities 252 in FIG. 2, respectively. The workflow 351 also shows application blocks 354.

The virtual infrastructure 315 includes management software 314 and virtualization software 356. The management software 314 can be hosted by the management server 114 of FIG. 1. The virtualization software 356 can include, for example, a hypervisor of the VM hosting the application 332. The workflow 351 can be initiated by the management software 314 utilizing the virtualization software 356.

The workflow 351 can include an auto-discovery phase. The auto-discovery phase can identify one or more applications including the application 332. The VEPA 344 can interact with virtualization tools 334 and/or a VM API (e.g., the VM API 246 in FIG. 2) to deploy the thin agent 336 on a VM (e.g., VM 224-1) and auto-discover the application 332 hosted by the VM.

The workflow 351 can also include an application consistent phase. The VEPA 344 can instruct the thin agent 336 to prepare the application 332 for a backup operation. The backup operation can include backing up the VM and the application 332. Backing up the VM can include storing the VM image 342 including VM blocks containing VM data and application blocks. In some examples, the VM data can include, for example, data associated with one or more application including the application 332. As such, backing up the VM image 342 can include backing up applications hosted by the VM. Backing up the application 332 can include storing application blocks containing application data.

The thin agent 336 can prepare the application 332 to perform a backup operation utilizing the application utilities 352. The thin agent 336 can prepare the application 332 performing application pre-backup tasks. For example, the thin agent 336 can place the application 332 in a backup state utilizing the application utilities 352. A backup state can generate a consistent state for the application 332. The thin agent 336 can report to the VEPA 344 that the application 332 is in a backup state. The thin agent 336 can also report to the VEPA 344 a completion of the pre-backup tasks. For example, the thin agent 336 can report a status of the pre-backup tasks and/or a status of placing the application 332 in a backup state.

The workflow 351 can also include a VM consistent phase. A VM snapshot of a VM hosting the application 332 can be obtained. Based on receiving a confirmation that the application 332 is in a backup state, the VEPA 344 can obtain the VM snapshot utilizing the VM API 246 in FIG. 2. The VM snapshot can generate a copy of a disk file of the VM at a point in time. The VM snapshot can be used to generate a VM image 342.

Obtaining a VM snapshot of the VM hosting the application 332 while the application 332 is in a backup state can result in a consistent state of the application 332 in the VM snapshot and the VM image 342. Accordingly, the VM image 342 can include application blocks 354 corresponding to the application 332 that is in a consistent state. The application blocks 354 can comprise application data corresponding to the application 332.

Although not shown, the VM can also include VM blocks. The VM blocks can comprise VM data corresponding to the VM hosting the application 332. The VM blocks can include data associated with the VM hosting the application 332. The VM snapshot and/or the VM image 342 can be stored in the VM hosting the application 332.

The workflow 351 can include thawing the application 332. Restoring the application 332 can include bringing the application 332 out of the backup state. The VEPA 344 can instruct the thin agent 336 to thaw or unfreeze the application 332. The application 332 can be brought out of the backup state utilizing the application utilities 352. The VEPA 344 can also instruct the virtualization tools 334 to delete the thin agent 336.

The workflow 351 can include preparing a proxy hosting the VEPA 344 for a backup phase. The proxy (e.g., VM 224-2) can be prepared by mounting the VM image 342. The VM image 342 can be mounted, for example, using a VMware hotadd transport mode. Mounting the VM image 342 provides the proxy access to the VM image 342 and/or the application blocks 354.

The workflow 351 can further include a backup application phase. In the backup application phase, the VEPA 344 can communicate with the ABA 350 to backup the application 354. The ABA 350 can read the offline application 332 from the VM image 342. For example, the ABA 350 can read the application blocks 354 from the mounted VM image 342.

The ABA 350 can provide the application blocks 354 to the media server agent 326. The media server agent 326 receives the application blocks 354. The media server agent 326 passes the application blocks 354 to the de-duplication engine 328 for further processing. Further processing can include the creation of hash-maps and the removal of duplicated data blocks.

The application 332 records and manages its backup metadata for further use during the restore and recovery operation. The metadata includes application backup information including what is backed up and which vendor backed up the application data, among other application backup information. The metadata is maintained by the application 332. The application 332 can utilize the metadata during the application recovery. For example, the application 332 can utilize the metadata to restore the application data.

The workflow 351 can also include a backup VM image phase. The backup VM image phase includes initiating a VM image-level backup using the VM API. The VM image backup can be initiated by the VEPA 344. The VEPA 344 can read the VM image 342 including the application blocks 354, and provide VM image 342 (e.g., the VM blocks and the application blocks 354) to the media server agent 326 and/or the de-duplication engine 328. In some examples, the workflow 351 can perform the backup VM image phase before performing the backup application phase. The workflow 351 can also perform the backup application phase before performing the backup VM image phase. The workflow 351 can also include performing the backup application phase and the backup VM image phase concurrently.

The de-duplication engine 328 can generate a hash-map utilizing the VM image 342 and the application blocks 354. The hash-map can associate the application blocks 354 with the VM image 342. For example, the hash-map can be associate data blocks bit information. Whenever there is another block read with the same information (e.g., same binary bits) as a previously data block, then the hash-map can provide a reference to the earlier data block.

The deduplication engine 328 can optimize the VM image 342 and/or the application blocks 354 by removing duplicated data blocks from the VM image 342. The de-duplication engine 328 can then store the de-duplicated blocks of the VM image 342 and/or the application blocks 354 to the backup storage devices 330. Removing the duplicated data blocks from the VM image 342 can include making application data blocks 354 that are part of the VM image 342 unavailable. For example, the VM image 342 can be saved to the backup storage devices 330 without including the application blocks 354 as part of the VM image 342. The application blocks 354 can also be saved independently of the VM images 342.

Storing the application blocks 354 independently from the VM image 342 (e.g., VM blocks) allows the application blocks 354 to be used to restore an application without restoring the VM utilizing the VM image 342. Saving the application blocks 354 independently from the VM image 342 allows the VM and the application to be restored simultaneously.

Removing the application blocks 354 from the VM image 342 allows for unique data to be stored. Storing unique data optimizes storage space by reducing the space used to store the VM image 342 and the application blocks 354. Reducing the space can also reduce a cost of storage and can also achieve a better performance.

The workflow 351 can also include a clean-up phase. The clean-up phase includes unmounting the VM image 342 from the proxy. The VM snapshots can also be deleted and/or consolidated using the VM API.

The examples described herein provide for application backups and VM backups in a single backup session. The examples provide for a granular application recovery. The examples provide for an application to be recovered without recovering the VM. The examples also provide for a point-in-time restoration of the application and the VM.

Although the examples shown herein describe backing up a single VM hosting a single application, a VM hosting a plurality of applications can be backed up. For example, the thin agent 336 can discover, freeze, and thaw a plurality of applications concurrently (e.g., at the same time). Accordingly, a snapshot of the VM can comprise different groupings of application blocks. A first set of application blocks can correspond to a first application, a second set of application blocks can correspond to a second application, a third set of application blocks can correspond to a third application, etc. The deduplication engine 328 can perform a de-duplication operation on the VM image 342 by removing the first set of application blocks, the second set of application blocks, and the third set of application blocks from the VM image 342 and by adding reference/pointers to the first set of application blocks, the second set of application blocks, and the third set of application blocks stored independently from the VM image 342. If some of the first set of application blocks are contained in the second set of blocks, then those application blocks are also removed as part of the deduplication process. The VM image 342 can be linked to each of the first, second, and third sets of application blocks such that the VM image 342 is associated with three different links/references.

Restoring the VM image 342 can include restoring the VM image 342 with the first, second, and/or third sets of application blocks. Each of the first, second, and third applications can be restored independently of the other applications and the VM blocks.

Figure 4:
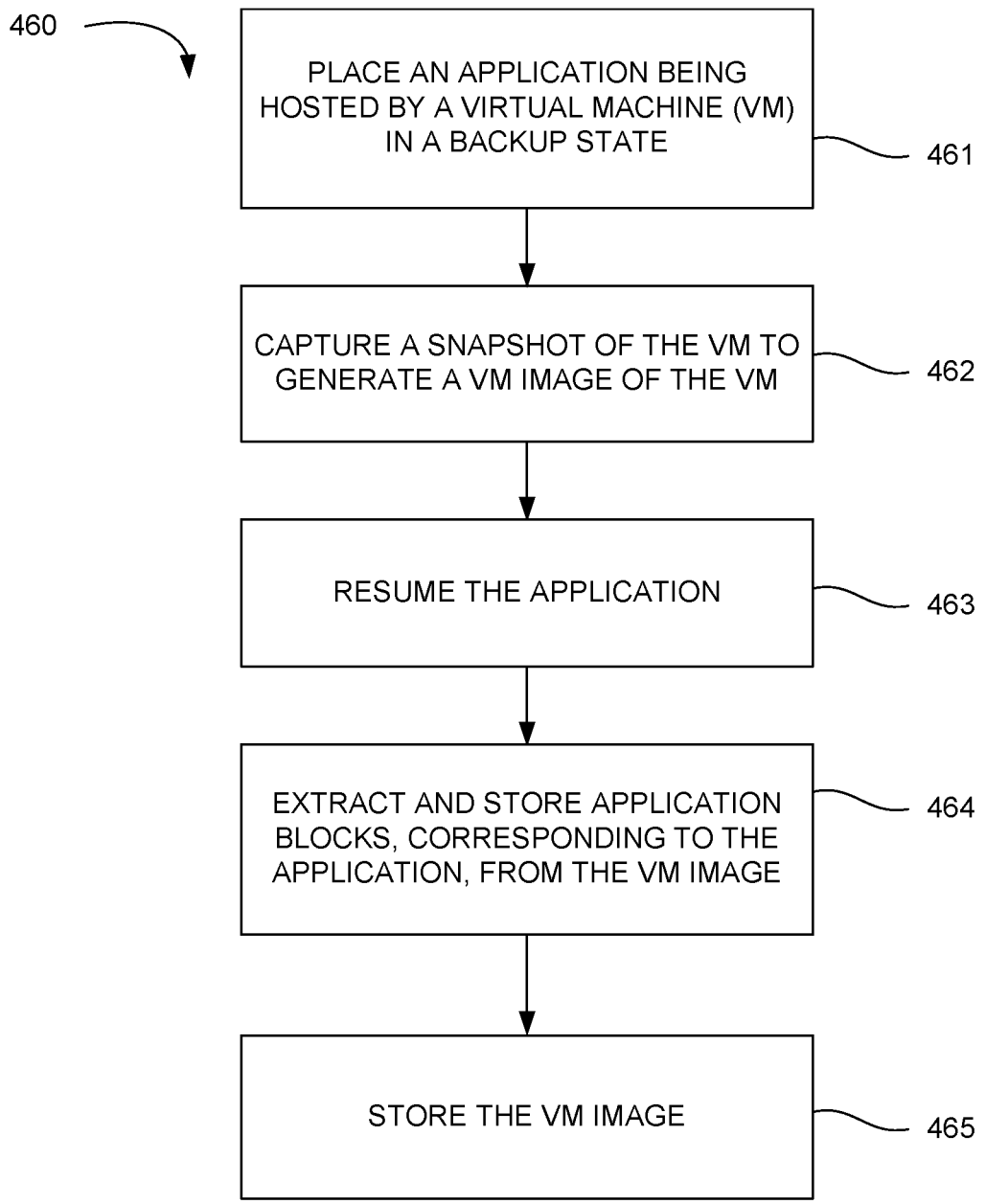
FIG. 4 illustrates an example flow diagram of a method consistent with the disclosure.

FIG. 4 illustrates an example flow diagram of a method 460 consistent with the disclosure. At block 461, the method 460 includes placing an application being hosted by a VM in a backup state. At block 462, the method 460 includes capturing a snapshot of the VM to generate a VM image of the VM. At block 463, the method 460 includes resuming the application. At block 464, the method 460 includes extracting and storing application blocks corresponding to the application from the VM image. At block 465, the method 460 includes storing the VM image.

Resuming the application further comprises bringing the application out of the backup state. The method 460 further comprises referencing the application blocks from the VM image. Referencing the application blocks from the VM image further comprises removing duplicated data from the VM image.

The method 460 further comprises restoring the application using the application blocks that are stored independently from the VM image. The method 460 further comprises restoring the VM using VM image blocks from the VM image and references to the application blocks that are stored independently from the VM image.

Figure 5:
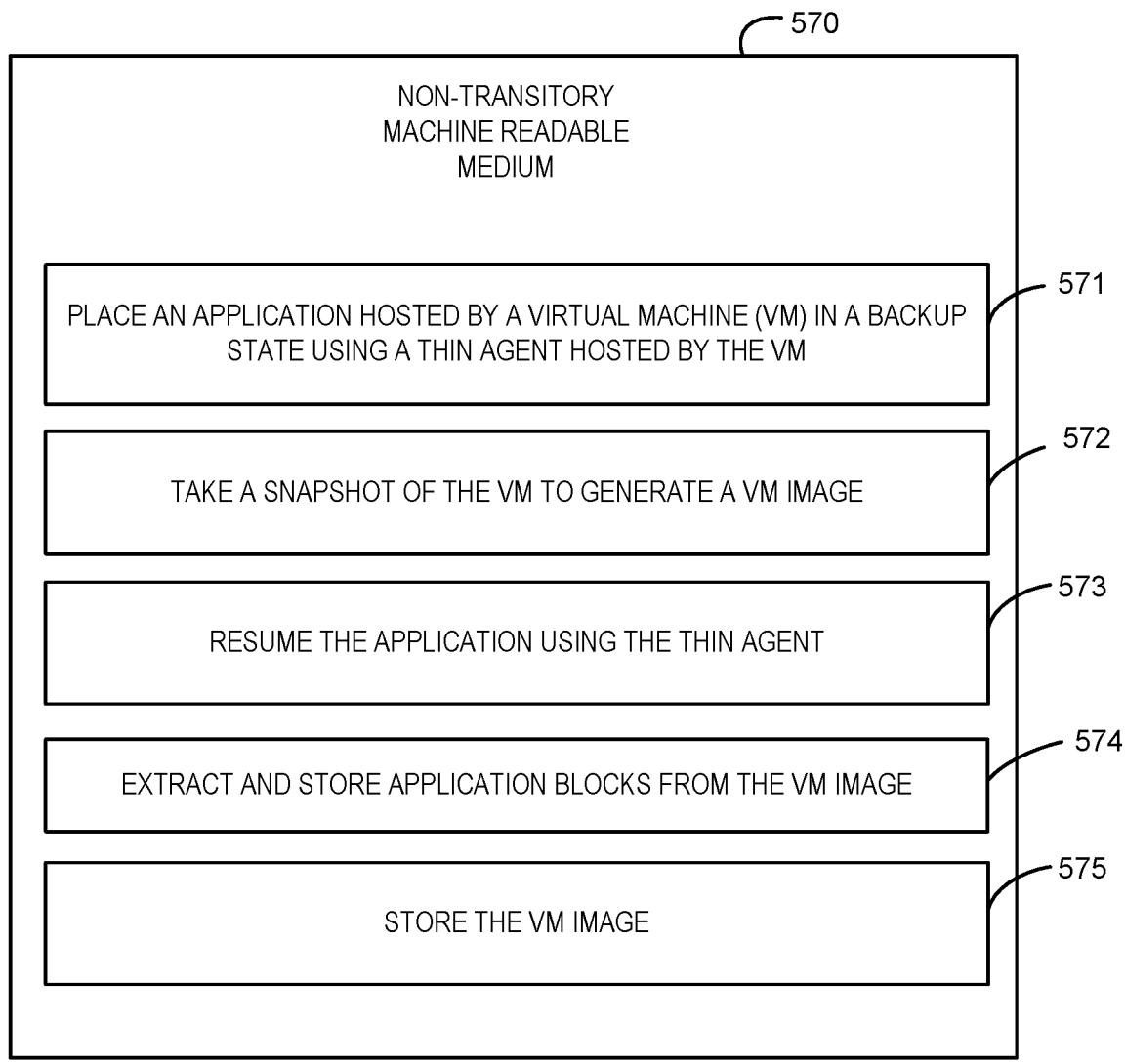
FIG. 5 illustrates an example non-transitory machine-readable medium consistent with the disclosure.

FIG. 5 illustrates an example non-transitory machine-readable medium 570 consistent with the disclosure. A processing resource may execute instructions stored on the non-transitory machine readable medium 570. The non-transitory machine readable medium 570 may be any type of volatile or non-volatile memory or storage, such as random access memory (RAM), flash memory, read-only memory (ROM), storage volumes, a hard disk, or a combination thereof.

The example medium 570 stores instructions 571 executable by a processing resource to place an application hosted by the VM in a backup state using the thin agent hosted by the VM. The example medium 570 stores instructions 572 executable by the processing resource to take a snapshot of the VM to generate a VM image. The example medium 570 stores instructions 573 executable by the processing resource to resume the application using the thin agent. The example medium 570 stores instructions 574 executable by the processing resource to extract and store application blocks from the VM image. The example medium 570 stores instructions 575 executable by the processing resource to store the VM image.

In some examples, the instructions 571 are further executable to push the thin agent to the VM of a computing device using virtual machine tools hosted by the VM. The example medium 570 can further store instructions to discover the application using the thin agent. The thin agent can be a non-persistent thin agent.

Placing the application in the backup state can further include placing the application in an application-consistent state by moving application data from memory to a disk. Storing the application blocks and the VM image further comprise storing the application blocks before the VM image is stored to backup target device. In some examples, storing the application blocks and the VM image further comprise storing the VM image before the application blocks are stored to backup target device. The example medium 570 can further comprise instructions to delete the thin agent from the VM.

Figure 6:
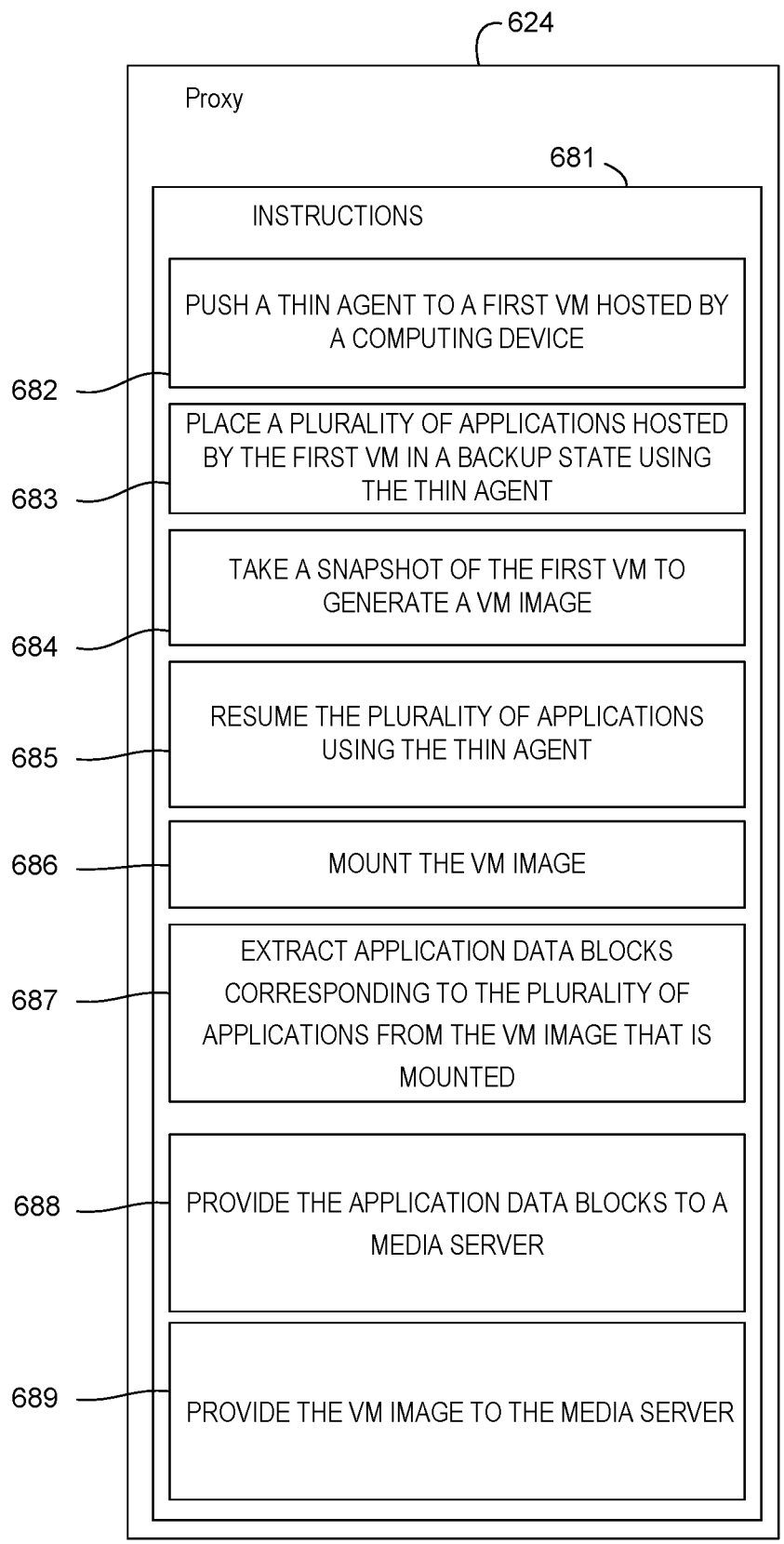
FIG. 6 illustrates a proxy for backing up an application and a virtual machine consistent with the disclosure.

FIG. 6 illustrates an example of a proxy 624 for backing up an application and a virtual machine consistent with the disclosure. The proxy 624 can include includes a processing resource and a memory resource to backup an application and/or a virtual machine.

The memory resource may store instructions 681 thereon. When executed by the processing resource, the instructions 681 may cause the proxy 624 to perform specific tasks and/or functions. For example, at block 682, the instructions 681 can be executed to push a thin agent to a first VM hosted by a computing device. At block 683, the instructions 681 can be executed to place a plurality of applications hosted by the first VM in a backup state using the thin agent. At block 684, the instructions 681 can be executed to take a snapshot of the first VM to generate a VM image.

At block 685, the instructions 681 can be executed to resume the plurality of applications using the thin agent. At block 686, the instructions 681 can be executed to mount the VM image.

At block 687, the instructions 681 can be executed to extract application data blocks corresponding to the plurality of applications from the VM image that is mounted. At block 688, the instructions 681 can be executed to provide the application data blocks to a media server. At block 689, the instructions 681 can be executed to provide the VM image to the media server.

The proxy 624 can be coupled to a media server. The media server can perform a de-duplication operation on the VM image and the application data blocks to remove duplicated data blocks and store the application data blocks and the VM image in backup storage devices. The media server can also generate a hash-map to associate the application data blocks to the plurality of applications and VM image data blocks. The media server can store the hash-map and references for the application data blocks and VM image. The media server can access the application data and the VM image using a plurality of references and the hash-map. The media server can further restore the application data blocks and the VM image. The media server can store the application data blocks and the VM image is further to separately store the application data blocks and the VM image.

The proxy 624 to push the thin agent can further push the thin agent using a virtual network. The proxy 624 can further unmount the VM image.

Figure 7:
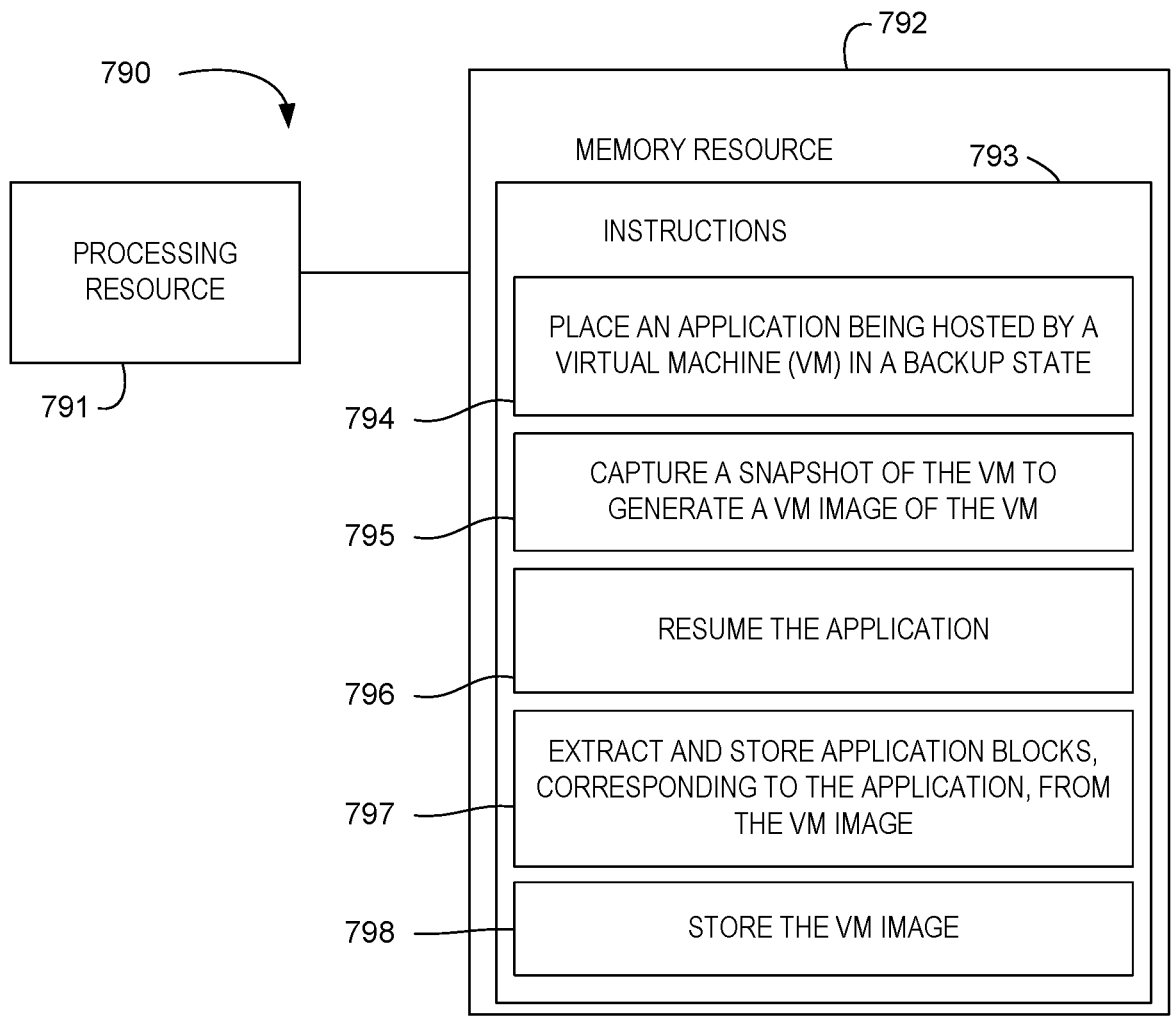
FIG. 7 illustrates an example of an apparatus consistent with the disclosure.

FIG. 7 illustrates an example of an apparatus 790 consistent with the disclosure. As shown in FIG. 7, the apparatus 790 includes a processing resource 791 and a memory resource 792.

The processing resource 791 may be a hardware processing unit such as a microprocessor, application specific instruction set processor, coprocessor, network processor, or similar hardware circuitry that can cause machine-readable instructions to be executed. In some examples, the processing resource 791 may be a plurality of hardware processing units that can cause machine-readable instructions to be executed. The processing resource 791 can include central processing units (CPUs) and/or graphics processing units (GPUs), among other types of processing units. The memory resource 792 may be any type of volatile or non-volatile memory or storage, such as random access memory (RAM), flash memory, read-only memory (ROM), storage volumes, a hard disk, or a combination thereof.

The memory resource 792 may store instructions 793 thereon. When executed by the processing resource 791, the instructions 793 may cause the apparatus 790 to perform specific tasks and/or functions. For example, at block 794, the memory resource 792 may store instructions 793 which may be executed by the processing resource 791 to cause the apparatus 790 to place an application being hosted by a VM in a backup state. At block 795, the memory resource 792 may store instructions 793 which may be executed by the processing resource 791 to cause the apparatus 790 to capture a snapshot of the VM to generate a VM image of the VM. At block 796, the memory resource 792 may store instructions 793 which may be executed by the processing resource 791 to resume the application.

At block 797, the memory resource 792 may store instructions 793 which may be executed by the processing resource 791 to cause the apparatus 790 to extract and store application blocks, corresponding to the application, from the VM image. At block 798, the memory resource 792 may store instructions 793 which may be executed by the processing resource 791 to cause the apparatus 790 to store the VM image.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A method comprising:
   placing a selected application being hosted by a virtual machine (VM) in a backup state;
   in a VM backup image phase, capturing a snapshot of the VM to generate a VM image of the VM;
   resuming the selected application;
   in an application backup image phase while the selected application is resuming execution, extracting from the VM image and storing application blocks corresponding to the selected application; and
   during the VM or application backup image phase, storing the VM image independently from the extracted and stored application blocks to enable the extracted and stored application blocks to restore the selected application from the VM image independently of restoring the VM to a normal state of operation using the VM image, wherein the snapshot of the VM comprises different groupings of application blocks, wherein a first set of application blocks corresponds to a first application and a second set of application blocks corresponds to a second application, wherein, when a selected application block of a first set of application blocks is contained in the second set of application blocks, the selected application block is removed as part of a duplication process, and wherein the VM image is linked to each of the first and second set of application blocks such that the VM image is associated with different links/references.

2. The method of claim 1, wherein the VM and application backup image phases occur at different times, wherein the VM is a virtual server, wherein resuming the selected application further comprises bringing the selected application out of the backup state, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references.

3. The method of claim 1, wherein the VM and application backup image phases occur concurrently, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references.

4. The method of claim 3, wherein the VM image is a mounted VM image, wherein the VM image comprises VM image blocks separate from the application blocks, wherein referencing the application blocks from the VM image further comprises a de-duplication engine removing duplicated data blocks from the VM image, wherein the duplicated data blocks comprise both application blocks and VM image blocks, wherein at least one VM image block is different from the application blocks, and wherein at least one application block is different from the VM image blocks, and further comprising, during the placing of the selected application in the backup state, referencing the application blocks from the VM image, further comprising in an auto-discovery phase, identifying one or more applications, the one or more applications comprising the selected application, and further comprising restoring the selected application using the application blocks that are stored independently from the VM image.

5. The method of claim 1, wherein the application backup image phase occurs before the VM backup image phase, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references.

6. The method of claim 1, wherein the VM backup image phase occurs before the application backup image phase, further comprising restoring the VM using VM image blocks from the VM image and references to selected application blocks that are stored independently from the VM image, and wherein a deduplication engine removes duplicated data blocks from the VM image to form de-duplicated blocks, stores the de-duplicated blocks of the VM image and/or the application blocks to a backup storage device, and makes the application blocks that are part of the VM image unavailable by saving the VM image to the backup storage device without including the application blocks as part of the VM image.

7. A non-transitory machine-readable medium storing instructions executable by a processing resource to:
   place a selected application hosted by a virtual machine (VM) in a backup state using a thin agent hosted by the VM;
   in a VM backup image phase, take a snapshot of the VM to generate a VM image comprising VM image blocks;

in an application backup image phase while the selected application is in the backup state, extract from the VM image and store application blocks corresponding to the selected application;
bringing the selected application out of the backup state using the thin agent; and
during the VM or application backup image phase, store the VM image independently from the extracted and stored application blocks to enable the extracted and stored application blocks to restore the selected application to a normal state of operation independently of restoring the VM to a normal state of operation using the VM image, wherein the snapshot of the VM comprises different groupings of application blocks, wherein a first set of application blocks corresponds to a first application and a second set of application blocks corresponds to a second application, wherein, when a selected application block of a first set of application blocks is contained in the second set of application blocks, the selected application block is removed as part of a duplication process, and wherein the VM image is linked to each of the first and second set of application blocks such that the VM image is associated with different links/references.

8. The non-transitory machine-readable medium of claim 7, wherein the VM and application backup image phases occur at different times, wherein the VM is a virtual server, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references.

9. The non-transitory machine-readable medium of claim 8, wherein the VM image comprises VM image blocks separate from the application blocks, wherein the instructions to push the thin agent are further to push a non-persistent thin agent and further comprising instructions to, during the placing of the selected application in the backup state, reference the application blocks from the VM image and, in an auto-discovery phase, identify one or more applications, the one or more applications comprising the selected application and further comprising instructions to discover the application using the thin agent and to store the VM image before storing the application blocks to a backup target device.

10. The non-transitory machine-readable medium of claim 7, wherein the VM and application backup image phases occur concurrently, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references.

11. The non-transitory machine-readable medium of claim 7, wherein the VM image comprises VM image blocks separate from the application blocks, wherein the instructions to place the selected application in the backup state are further to place the selected application in an application-consistent state by moving application data from memory to a disk and further comprising instructions to remove duplicated data blocks from the VM image, wherein the duplicated data blocks comprise both application blocks and VM image blocks, wherein at least one VM image block is different from the application blocks, and wherein at least one application block is different from the VM image blocks.

12. The non-transitory machine-readable medium of claim 7, wherein the application backup image phase occurs before the VM backup image phase, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references, wherein the VM image is a mounted VM image, and wherein an instruction to store the application blocks and the VM image are further to store the application blocks before the VM image is stored to a backup target device.

13. The non-transitory machine-readable medium of claim 7, wherein the VM backup image phase occurs before the application backup image phase, wherein the snapshot of the VM comprises different groupings of application blocks, wherein a third set of application blocks corresponds to a third application, wherein a deduplication engine performs a de-duplication operation on the VM image by removing the third set of application blocks from the VM image, adds reference/pointers to the first set of application blocks, the second set of application blocks, and the third set of application blocks stored independently from the VM image, and wherein the VM image is linked to the third set of application blocks such that the VM image is associated with three different links/references, and wherein an instruction to store the application blocks and the VM image are further to store the VM image before the application blocks are stored to a backup target device, and further comprising instructions to push the thin agent to the VM of a computing device using virtual machine tools hosted by the VM and to store the application blocks before storing the VM image to the backup target device.

14. The non-transitory machine-readable medium of claim 7, further comprising instructions to delete the thin agent from the VM and instructions to restore the VM using the VM image blocks from the VM image and references to selected application blocks that are stored independently from the VM image and instructions to remove duplicated data blocks from the VM image to form de-duplicated blocks, store the de-duplicated blocks of the VM image and/or the application blocks to a backup storage device, and make the application blocks that are part of the VM image unavailable by saving the VM image to the backup storage device without including the application blocks as part of the VM image.

15. A system to backup a virtual machine (VM), comprising:
a proxy to:

push a thin agent to a first VM hosted by a computing device;
place a plurality of applications hosted by the first VM in a backup state using the thin agent;
in a VM backup image phase, take a snapshot of the first VM to generate a VM image;
resume the plurality of applications using the thin agent;
mount the VM image;
in an application backup image phase after the plurality of applications have resumed execution, extract, from the VM image that is mounted, application data blocks corresponding to the plurality of applications;
provide the extracted application data blocks to a media server; and
provide the VM image to the media server; and
the media server to:
perform a de-duplication operation on the VM image and the extracted application data blocks to remove duplicated data blocks and provide de-duplicated application data blocks, wherein the VM image comprises different groupings of application blocks, wherein a first set of application blocks corresponds to a first application and a second set of application blocks corresponds to a second application, wherein, when a selected application block of a first set of application data blocks is contained in the second set of application blocks, the selected application data block is removed as part of a deduplication operation, and wherein the VM image is linked to each of the first and second sets of application data blocks such that the VM image is associated with different links/references; and
during the VM backup state or application backup state, store the de-duplicated application data blocks independently from the VM image in one or more backup storage devices to enable the extracted and stored de-duplicated application data blocks to restore each of the plurality of applications to a normal state of operation independently of restoring the first VM to a normal state of operation using the VM image.

16. The system of claim 15, wherein the application backup image phase occurs before the VM backup image phase, wherein a third set of application data blocks corresponds to a third application, wherein a deduplication engine performs the de-duplication operation on the VM image by removing the third set of application data blocks from the VM image, adds reference/pointers to the first set of application data blocks, the second set of application data blocks, and the third set of application data blocks stored independently from the VM image, and wherein the VM image is linked to the third set of application data blocks such that the VM image is associated with three different links/references, wherein the VM image comprises VM image blocks separate from the application data blocks, wherein the media server stores the VM image independently from the extracted application data blocks in separate backup storage devices, wherein the proxy to push the thin agent is further to push the thin agent using a virtual network, and wherein the thin agent places a database accessed by the plurality of applications in a consistent state in which each of the plurality of applications transfers application data from volatile memory to non-volatile memory.

17. The system of claim 15, wherein the VM backup image and application backup image phases occur at different times, wherein a third set of application data blocks corresponds to a third application, wherein a deduplication engine performs the de-duplication operation on the VM image by removing the third set of application data blocks from the VM image, adds reference/pointers to the first set of application data blocks, the second set of application data blocks, and the third set of application data blocks stored independently from the VM image, and wherein the VM image is linked to the first, second, and third set of application data blocks such that the VM image is associated with three different links/references, wherein the first VM is a virtual server, wherein the proxy provides the extracted application data blocks and VM image to the media server at different times, wherein the media server is further to generate a hash-map to associate the application data blocks to the plurality of applications and VM image data blocks and wherein the hash-map provides, for a selected application data block, a reference to a second application data block or VM image block having identical binary bits.

18. The system of claim 16, wherein the proxy provides the extracted application data blocks and VM image to the media server at different times, wherein the media server is further to:
store a hash-map and references for the application data blocks and VM image;
access the application data and the VM image using a plurality of references and the hash-map; and
restore the application data blocks and the VM image, wherein duplicated data blocks comprise both application data blocks and VM image blocks, wherein at least one VM image block is different from the application data blocks, and wherein at least one application data; block is different from the VM image blocks.

19. The system of claim 15, wherein the VM backup image and application backup phases occur concurrently, wherein the proxy is further to unmount the VM image, wherein the snapshot of the first VM comprises different groupings of application data blocks, wherein a first set of application data blocks corresponds to a first application, a second set of application data blocks corresponds to a second application, and a third set of application data blocks corresponds to a third application, wherein a deduplication engine performs a de-duplication operation on the VM image by removing the first set of application data blocks, the second set of application data blocks, and the third set of application data blocks from the VM image, adds reference/pointers to the first set of application data blocks, the second set of application data blocks, and the third set of application data blocks stored independently from the VM image, wherein when a selected application data block of the first set of application data blocks is contained in the second set of application data blocks, the selected application data block is removed as part of the deduplication operation, and wherein the VM image is linked to each of the first, second, and third sets of application data blocks such that the VM image is associated with three different links/references.

20. The system of claim 19, wherein the media server to store the application data blocks and the VM image is further to separately store the application data blocks and the VM image and wherein the thin agent restores the VM image with the first, second, and/or third sets of application data blocks, and wherein each of the first, second, and third applications is restored independently of the other of the first, second, and third applications and VM image blocks.

* * * * *